United States Patent [19]

Quintana

[11] Patent Number: 5,205,365
[45] Date of Patent: Apr. 27, 1993

[54] PRESSURE ASSISTED RUNNING OF TUBULARS

[75] Inventor: Julio M. Quintana, LaHabra, Calif.

[73] Assignee: Union Oil Company of California, Los Angeles, Calif.

[21] Appl. No.: 662,168

[22] Filed: Feb. 28, 1991

[51] Int. Cl.$^5$ .............................................. E21B 4/00
[52] U.S. Cl. ..................................... 175/97; 175/230; 166/380
[58] Field of Search ............................. 175/97-99, 175/230; 166/380, 109, 169

[56] References Cited

U.S. PATENT DOCUMENTS

| | | | |
|---|---|---|---|
| 241,039 | 5/1881 | Malcolmson | 166/169 X |
| 2,381,929 | 8/1945 | Schlumberger | 166/169 X |
| 2,941,500 | 6/1960 | Adams | 166/169 X |
| 3,797,589 | 3/1974 | Kellner et al. | 175/94 |
| 3,799,277 | 3/1974 | Kellner | 175/230 X |
| 3,827,512 | 8/1974 | Edmond | 175/230 X |
| 3,855,853 | 12/1974 | Claycomb | 175/40 X |
| 4,139,058 | 2/1979 | Gano | 166/85 |
| 4,615,401 | 10/1986 | Garrett | 175/94 X |
| 4,621,698 | 11/1986 | Pittard et al. | 175/305 |
| 4,669,554 | 6/1987 | Cordry | 166/169 X |

OTHER PUBLICATIONS

"A-Z Fishing Bumper Sub", A-Z International Tool Company, Houston, Texas, p.28.
"Timesaver Jars and Bumper Subs", Baker Service Tools, p. 1049.
"Bowen Surface Bumper Jar", Bowen Lubricated Fishing Bumper Subs, and Bowen Fishing Bumper Subs, pp. 1295-1297, Bowen Company.
"Griffith Bumper Sub", Griffith Co.
"Homco Hexagonal Bumper Jar", Homco, p. 10.
"Long Stroke Bumper Subs", Houston Engineers, pp. 4207-4210.
"Bumper Subs", Petroleum Equipment Group, Joy Manufacturing Company, pp. 55-59.
"Type BSO Bumper Sub", Petroleum Solids Control, Inc., p. 7100-7101.

*Primary Examiner*—Ramon S. Britts
*Assistant Examiner*—Roger J. Schoeppel
*Attorney, Agent, or Firm*—Gregory F. Wirzbicki; William O. Jacobson

[57] ABSTRACT

A pressure actuated, telescoping subassembly is supported by a pipe string to axially move an attached member within a wellbore. Increasing fluid pressure to the subassembly actuates a telescoping action, axially moving the attached member but not the supporting pipe string. Motion can be used during rotary drilling or running of tubulars into a drilled borehole portion. Pressure actuation provides a means to remotely apply axial force near the member, such as a tool or drill string portion. Moving only the member instead of the entire drill string and member lowers the total force required to move members and provides a new means to chase drill bits and apply constant drilling forces. This minimizes the risk of pipe string overloading and buckling, exceeding rig weight limitations, and tool bit damage.

19 Claims, 2 Drawing Sheets

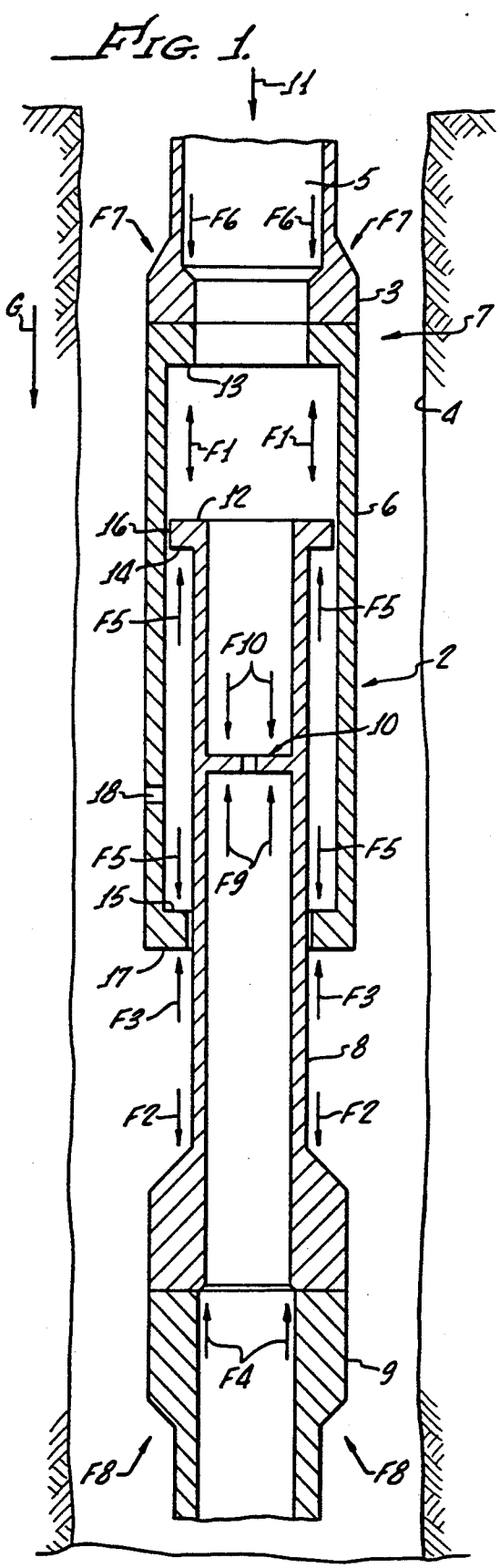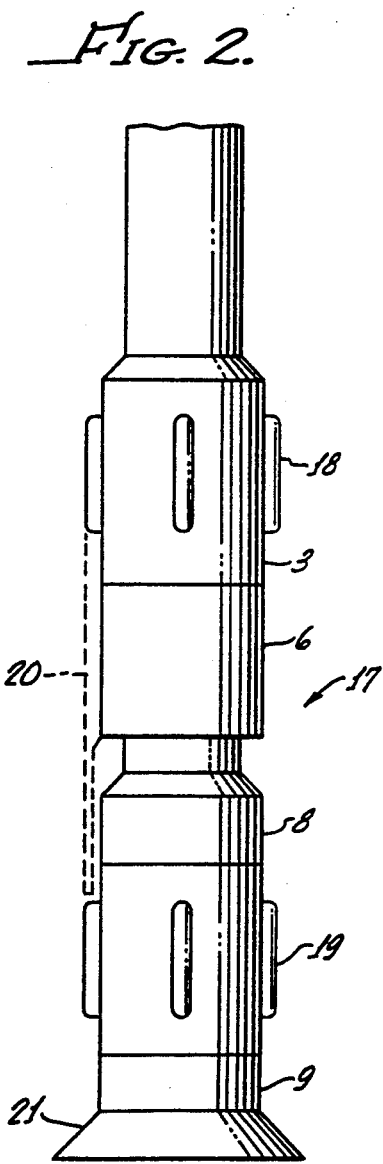

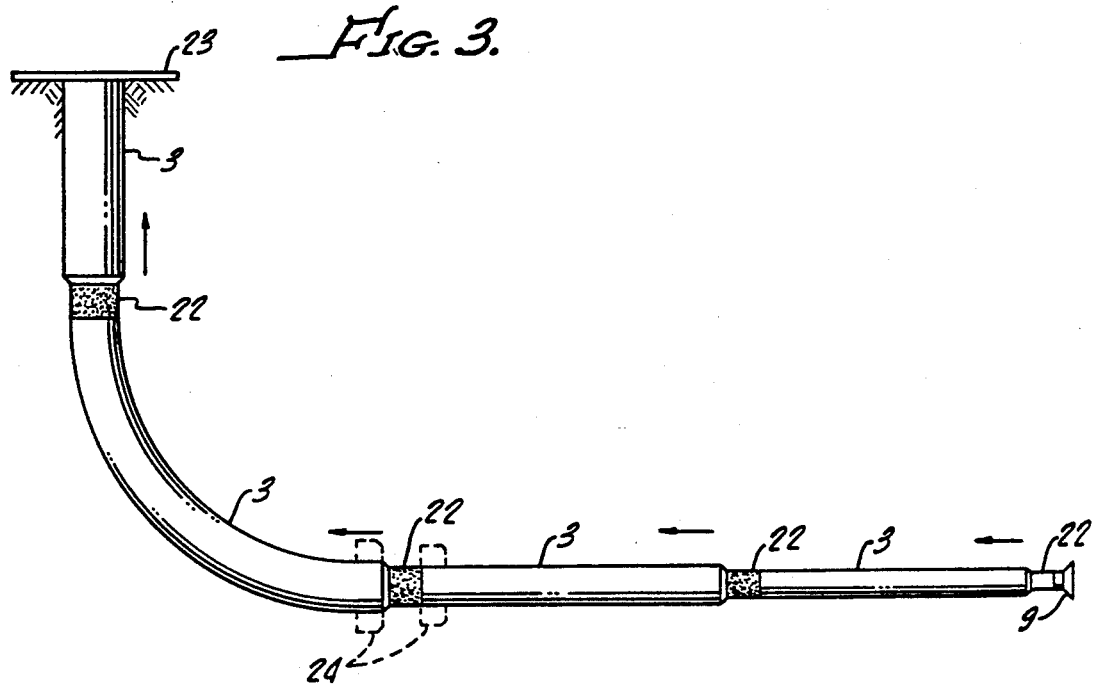
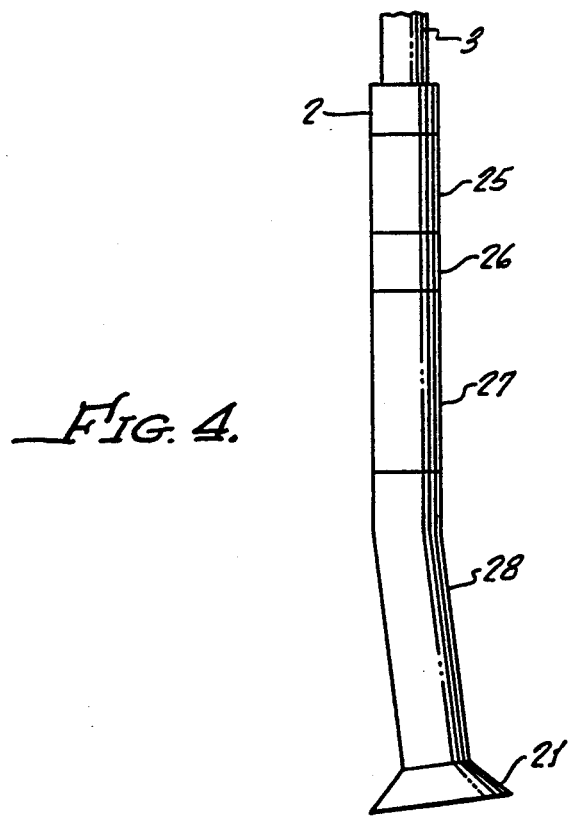

PRESSURE ASSISTED RUNNING OF TUBULARS

FIELD OF THE INVENTION

This invention relates to drilling (including completion) methods and devices. More specifically, the invention is concerned with providing a device which overcomes drag forces when running tubulars into a pre-drilled extended reach well.

BACKGROUND OF THE INVENTION

Many subsurface resources, such as oil bearing formations, can no longer be exploited by drilling wells having vertical boreholes from the surface. Extended reach wells, such as wells drilled from platforms or "islands" and having long non-vertical or deviated portions, are now common. A deviated hole portion is defined as one having an axis in a direction at a significant incline angle to the vertical or gravity direction. The inclined portion is typically located below an initial (top) portion which is nearly vertical. A deviated (lower) portion may have an inclined angle from the vertical that may approach 90 degrees (i.e., nearly horizontal). The result is a well bottom laterally offset from the top by a significant or extended distance.

Conventional drill bit technology can produce a borehole portion at almost any incline angle, but extended reach operations at inclined angles have experienced problems. Drilling problems are primarily caused by drag forces on the long and non-vertical drill string rotating the drill bit. More severe problems can occur when a long casing or liner strings are slid and set in highly deviated (pre-drilled) wells.

Casing or liner strings are generally larger and heavier than a rotating drill string. In an inclined well bore, the larger diameter casing and liners tend to increase contact and bearing weight, dramatically increasing drag forces. Because of this increased drag, the torsional forces that would be needed to rotate the casing or liner can be greater than the torsional strength of the pipe itself, or greater than the available rotary torque. Casing or liner strings are therefore normally run (i.e., slid) into the hole without drag reducing rotation.

This non-rotational drag problem is the result (at least in part) of the differences between the static and sliding coefficients of friction. A static coefficient of friction is almost always significantly higher than a sliding coefficient of friction. Thus, rotation during drilling creates constant (sliding) motion, preventing higher static friction even if the drill string is not moving in an axial direction. But once rotation and axial motion within the well bore stops or is interrupted, as in the cases of running casing or orienting a drill string, significantly higher forces may be required to move tubulars because of the difference between sliding and static coefficients of friction.

Drilling or completing an extended reach (or long deviated portion) borehole can exacerbate normal drag forces and problems in addition to inclined well drag forces. Interruptions in drilling or running liner/casing are more likely in an extended reach well. Risk of sticking is especially high if the incline angle exceeds a critical angle. A critical angle produces more drag force than the component of weight tending to slide the casing or liner down the hole. Even if a stuck string is avoided, the forces needed to overcome high drag may cause serious damage to the pipe. These problems create high risk for extended reach wells.

Although high risk, producing some resources through long horizontal well portions or intervals can be very profitable. Fluid production from low permeability and/or thin bed reservoirs may not be economic using near vertical wells but profitable using an extended reach well. Production from shallow resources in fields having limited surface access may not even be possible without extended reach boreholes. For example, an offshore drilling site near an offshore resource may be unlicensable. The ability to reach out to an offshore resource from an on-shore site may mean the difference between an unavailable resource and a producing reservoir.

Even for fields where reservoir access or low permeability is not a problem, long, nearly horizontal well portions may be economically desirable in spite of high cost and risk. Significant production may be possible from extended horizontal well portions in a vertically permeable layer where vertical wells produce excessive unwanted water from adjacent layers, i.e., a large coning effect occurs.

Options to mitigate high drag related problems in extended reach wells are available. For example, high drag mitigation methods can: 1) add shocks and forces to tubulars near the surface, e.g., using a bumper subassembly or adding surface weights; 2) reduce the coefficient of friction, e.g., by lubrication or conditioning of the borehole; or 3) reduce drag-inducing (normal-to-the-borehole) wall forces.

However, these mitigation options are generally costly and may not be effective for many extended reach wells. For example, only a bounded amount of added weight can be exerted at the top vertical portion of a long pipe string before structural limits are reached. Excessive downward force which would be needed for extended reach wells also tends to buckle the string, adding still further drag forces (if laterally supported in a highly deviated well bore) prior to causing structural failure. Adding weight in the inclined portions beyond the critical angle only increases drag. In addition, drilling with large added downward forces may be impractical or rig pick up weight limits may be exceeded.

Similar limits affect methods for reducing the coefficient of friction (e.g., hole conditioning, drag reducing, or lubricating). As longer pipe strings are run into an extended reach well, even a lubricated string will eventually generate unacceptable drag forces because friction is only reduced, not eliminated. The geometry and borehole wall conditions (e.g., interface surface) of some holes may also create increased sliding resistance (high drag) conditions even with lubricated strings.

A flotation method of placing a pipe string into a deviated, liquid-filled hole is also known which lowers drag by reducing forces normal to the wall. This buoyant or floatation method is illustrated in U.S. Pat. No. 4,986,361. After providing a means to plug a pipe string portion, the portion is filled with a low density fluid to provide a buoyant force, reducing the forces acting normal to the walls in nearly horizontal portions. However, the low density fluid normally must be removed from the pipe string after feeding the plugged string into the well bore and prior to cementing. Cementing operations are then typically accomplished without a low density fluid providing a buoyant force.

It would be desirable to further reduce the drag forces associated with moving an entire drill string or casing string. The drag forces require large weights or force application apparatus and high string strengths.

SUMMARY OF THE INVENTION

The present invention provides a means to move a portion of the string by a pressure activated apparatus. The apparatus avoids entire string drag problems by inserting a telescoping subassembly actuated by pressure in the pipe string within a wellbore. Increasing fluid pressure to the subassembly axially moves only a portion of a downhole pipe string. The axial motion can be used during rotary drilling or to assist in running tubulars into a drilled borehole. Like the conventional near-surface added weight/force methods, the present invention adds force, but pressure actuation provides a means to remotely apply axial force to only where it is needed. Moving only a portion of the tubulars or tools lowers the total force required to drill and unstick tubulars, and provides a new means to apply constant drilling forces. This apparatus minimizes the risk of overloading the string, pipe string buckling, exceeding rig weight limitations, tool bit damage, etc.

The telescoping subassembly is attached between sections of ducted pipe and/or tools, allowing surface pressurized fluid to actuate the subassembly. The attached telescoping subassembly and ducted elements form an assembly within the borehole. When motion of a portion of the string is needed, the subassembly is actuated by increased pressure.

The assembly includes a drill string extending to the surface when placed in a well. The drill string provides a fluid passage from a downhole location to a fluid pressure source located at the surface. Opposite to the end of the subassembly attached to the drill string is an element attached to the other end of the subassembly, forming a complete string. This element can be moved by a change in fluid pressure.

BRIEF DESCRIPTION OF THE DRAWINGS

FIG. 1 shows a sectioned side view of a telescoping assembly in a borehole;

FIG. 2 shows a side view of an alternative drilling embodiment similar to the assembly shown in FIG. 1;

FIG. 3 shows a schematic of multiple telescoping subassemblies in an extended reach drilling application; and FIG. 4 shows a schematic of a subassembly used in conjunction with a steerable drilling assembly.

In these Figures, it is to be understood that like reference numerals refer to like elements or features.

DETAILED DESCRIPTION OF THE INVENTION

FIG. 1 shows a sectioned view of a pressure actuated assembly 2, which is an entire apparatus within a subsurface cavity or borehole 4. The assembly 2 includes a drill pipe or other tubular member 3 extending towards the ground surface (opposite to the downward direction of gravity, G, shown) within the borehole 4 (only of portion of which is shown for clarity), a telescoping subassembly 7, and a member 9. The drill pipe 3 has an interior passageway containing pressurized fluid 5, which is supplied by a source connected to the drill pipe, typically located at or near the surface (not shown for clarity). The interior passageway of drill pipe 3 provides a fluid passageway to the telescoping subassembly 7.

The telescoping subassembly includes a first and second tubular elements, 6 & 8. The drill pipe 3 is attached, e.g., by means of threads or a weldment, to the first tubular element 6 of a telescoping subassembly 7. The first tubular element 6 is slidably attached to the second tubular element 8. The opposite end of second tubular element 8 of the subassembly 7 is attached to a member 9, such as a drill bit, collar, liner or casing. Attachment of the subassembly 7 to the member 9 may be a direct affixing, such as a threaded joint or weldment, or alternatively attached through an intermediate tool, pipe, or other device.

The subassembly 7 also includes an optional fluid orifice 10, which is shown attached within the fluid passageway of the second element 8. The orifice creates a pressure difference when fluid 5 is flowing in the passageway. The pressure differences creates forces tending to move one element relative to the other. Fluid 5, such as a drilling mud, can flow within the internal passageways of drill pipe 3, first element 6, second element 8, orifice 10, and member 9. When fluid 5 is flowing downward (direction G), an unbalanced force is created between surfaces above and below the optional orifice 10. Other fluid restrictions within the fluid passageways may also create pressure differences within the assembly 2. Fluid is also typically present within the wellbore 4, i.e., in the annulus between the wellbore walls and assembly 7.

The internal and external fluid pressures acting on assembly 7 surface areas result in forces having a net axial component sufficient to axially move one of the subassembly 7 elements (and any attached devices) relative to another element (e.g., another portion of the drill string). The net force resulting from fluid pressure on each surface are shown as labeled F arrows. Axial components of net forces F6, F1, F4, F9, and F10 result from internal fluid pressures acting on internal surfaces. Net forces F8, F2, F3, and F7 result from external fluid pressures.

Force F5 may result from internal pressure if fluid is allowed to pass the first sliding interface 16 and is restricted at the second sliding interface 17. In the preferred embodiment, force F5 result from external fluid pressure as external fluid is allowed to pass the second sliding interface 17 and is sealed at the first sliding interface 16. Axial forces can be calculated from the fluid pressure and the projection of surface areas in a plane perpendicular to the axis 11 of assembly 2. Although F1 and F5 forces are shown as equal in the upward and downward directions, the upward and downward forces may be different depending upon cross sectional areas of the elements of the assembly or tool. An optional bleed port 18 (with or without a restriction or control valve) may also be used to control fluid pressure in the subassembly 7 and therefore upward and downward forces, such as F5 acting to open the subassembly 7.

In addition to these pressure-related forces, other forces having axial components may act upon assembly 2. These other forces include the weight of the assembly 2, means for supporting the assembly weight, drag between the assembly 2 and well bore 4, and operating forces, such as drilling. These pressure and other forces can be calculated, measured or estimated, so that fluid pressure change is a major portion of the forces needed to actuate the subassembly. This portion can be minor when in a near vertical well (e.g., weight supplying the major portion of the force needed to actuate), but is normally at least 75 percent, typically at least 90 percent of the force needed to actuate the telescoping subassembly.

Actuation, by increasing fluid pressure, may actuate the subassembly from the intermediate position (as shown) to a more open position. Alternative pressure unbalanced configurations of the subassembly could actuate the subassembly towards a more closed position. The limit to closing motion occurs when an end surface 12 of second element 8 contacts or lands on an end contact surface 13 of the first element 6, creating an axially short or closed position of subassembly 7. The open position occurs when a stop surface 14 of second element 8 lands or contacts on a stop contact surface 15 of the first element 6.

Alternatively, the pressure unbalance of the assembly can be made dependent upon the subassembly axial or radial position. A spring or bias element can be used to supplement or provide the F5 forces, e.g., a cushion subassembly. The location and number of bleed ports 18, combined with sliding interface passageways, can be sized to alter forces dependent upon subassembly position. A tapered bore of first tubular element 6 at sliding interfaces may also be used to alter fluid pressure forces as a function of position. A conical orifice restrictor body located at the flow centerline axis may also be attached to the first element 6 to alter the pressure drop across the optional orifice 10 as a function of relative element position.

In the preferred embodiment shown, the first element 6 and second element 8 have a square or hexagonal cross sectional shape (when viewed along an axis from the top or bottom). This geometry (or other than a circular cross sectional geometry) transmits torque when tubulars are rotated around the axis. Rotation is typically used during drilling operations.

When the assembly is used in drilling operations, the member 9 of assembly 2 may comprise a drilling tubular attached to a drill bit. The assembly 2 is lowered into the borehole 4 in a first or closed position until the drill bit 9 is at or near the bottom of the borehole 4 being drilled. Drilling mud 5 is circulated, i.e., flowed, from the surface through the assembly 2 and back to the surface through the annulus between the assembly 2 and borehole 4. When fluid pressure is increased to a sufficient level, the telescoping subassembly is actuated out of its closed position, forcing the drill bit 9 into the bottom face (not shown) of the borehole, allowing cutting and drilling. When the subassembly 7 is between the open and closed position, axial drilling forces on the tubular string and drill bit 9 are independent of the surface supporting loads and drag acting on upwell portions of the assembly. Drilling and cutting loads on the drill bit are therefore relatively constant, allowing a relatively constant cutting speed. The pressure controlled axial forces near the drill bit avoid drill string buckling, bit overloading, lack of directional control, and other drilling problems.

The elements of the subassembly 7 can be made from tubular steel elements. The assembly may also be adapted from other telescoping subassemblies, such as shock subassemblies and bumper subassemblies.

A side view of an alternative drilling embodiment assembly 17 is shown in FIG. 2. The internal configuration of the alternative assembly 17 is similar to that shown for the assembly 2 as shown in FIG. 1. However, FIG. 2 shows the external surfaces of the drill pipe 3 and second element 8 having attached external flutes or centralizers 18 and 19. The member 9 is a drill bit radially enlarged at the bottom to cut the full diameter of borehole 4. (See FIG. 1.)

The stabilizers (or centralizers) 18 and 19 extend radially outward to center the assembly 17 within the borehole 4. (See FIG. 1.) Other stabilizers (similar to those shown in FIG. 2) alternatively may be attached to other portions of the assembly 17.

In one alternative stabilizer embodiment, flutes 19 on the second element 8 are constrained from completely rotating with respect to the first element 3 when the assembly is in the closed position. This is accomplished by an extension 20 of one or more flutes 18 (one shown dotted for clarity) or other anti-rotation means. The extension 20 is shown about to engage the flutes 19 upon further closing motion of the subassembly.

During drilling, a fluid pressure is selected which applies an optimum drilling "weight" or axial force on the drill bit, without having to correct for drill string drag. Control of fluid pressure allows the drilling forces to be changed quickly as drilling progresses.

Axial forces to overcome drilling resistance on a drill bit are developed by fluid pressures and are theoretically unlimited. For example, forces can range up to 100,000 pounds (444,800 newtons), assuming a drag (friction) coefficient ranging from 0.3 to 0.8, a fluid pressure of 4,000 psig (273 atmospheres), and an assembly having a diameter of approximately 8 inches (approximately 20.3 cm). Axial forces derived from fluid pressure changes and applied to other conventional size casings or devices are expected to be at least 1,000 pounds (4,448 newtons) but more typically are expected to range from 2,000 to 10,000 pounds (8,896 to 44,480 newtons). Larger sizes and higher pressures can generate forces ranging from 50,000 to 400,000 pounds (222,400 to 1,779,200 newtons).

A major advantage of the telescoping assembly is the capability of reaching the total depth (TD) without exceeding surface weight limitations, i.e., running out of weight. This also minimizes stresses on the drill pipe. Another advantage of the assembly when used in drilling applications is minimizing the risk of a stuck drill string 3 and bit 9, especially in extended reach boreholes. Since the drill bit 9 is not supported or fixed to the drill string 3 when in an intermediate position, the drill bit 9 position is independent of the drill string 3 axial motion and static friction.

For example, if a stuck drill bit 9 is detected, the drill string 3 can be raised (e.g., from an intermediate to an open position) using significantly less axial force that is conventionally required to both free the drill bit 9 and overcome the attached drill string 3 static friction. If no means for preventing relative rotation (or means are disconnected as shown in FIG. 2), the drill string 3 can be rotated as well as axially displaced prior to applying drill bit 9 unsticking forces. Only similarly reduced forces are needed to unstick a stuck drill string 3, as compared to overcoming drill bit and drill string static drag forces.

FIG. 3 shows a schematic of an alternative assembly having multiple telescoping subassemblies in an underground extended reach well. A drill bit 9 is attached to one of the subassemblies 22, similar to that shown in FIG. 2. Each of the other subassemblies 22 connect two portions of drill pipe 3. The arrows at the drill bit 9 and each subassembly 22 represent the net of fluid pressure forces at that point. As shown, the direction of each of the net axial forces shown tends to move the drill bit 9 and drill pipe 3 portions towards a ground surface 23, but axially opposite net forces can also be accomplished. As shown, the drill pipe 3 portions progressively increase in diameter in the direction towards the surface 23; however, this increase in diameter is not necessary.

In the configuration shown in FIG. 3, if one drill string portion gets stuck (or otherwise needs to be moved), the moving or unsticking force to move the stuck portion is a fraction of that needed to move the entire drill string. The smaller force is also applied directly to the drill string portion needing to be moved. The application of this fractional force further reduces the risk of overstressing or other drag related problems. Moving a different drill string portion may also be selected by having different actuation pressures for each subassembly.

FIG. 3 can also be used to illustrate an application of running a casing or liner assembly into the borehole 4 (see FIG. 1). Instead of drill pipe sections, liner or casing tubulars 3 are run into the borehole and instead of the drill bit device previously discussed, the member 9 may be a float shoe. If sliding and/or rotation of the entire casing or liner is not feasible, sliding the assembly can be accomplished by snaking into the borehole, i.e., sliding one section at a time. Again, only reduced forces are needed to overcome drag forces on each portion, and these reduced drag overcoming forces primarily result from external and internal fluid pressures. In the preferred embodiment for running a liner, one telescoping subassembly is attached between the liner and supporting pipe string and subsequently released with the supporting pipe string after the liner is set.

A means of fixing the relative axial motion may also be needed in running a liner or casing (possibly releasably attached to an operating drill string). Fixing can be by cementing the assembly within the borehole, coupling threaded interfaces, or setting on abutting lands. After fixing, removal of any operating drill string or other tubular portions can be accomplished by a release joint or tool attached to the liner or casing.

Although the maximum and minimum pressures that can be used to actuate the telescoping subassembly are theoretically unlimited, the pressures are typically limited to a range of from 500 to 15,000 psig (35 to 1021 atmospheres), preferably within the range from 500 to 10,000 psig (35 to 681 atmospheres), most preferably within the range from 500 to 5,000 psig (35 to 350 atmospheres), and most highly preferred within the range from 500 to 4,000 psig (35 to 273 atmospheres). Similarly, the distance between the closed and open positions is theoretically unlimited, but this distance is typically at least 0.5 foot (0.1524 meters), but no more than 10 feet (3.048 meters), preferably within the range of 0.5 to 5 feet (0.1524 to 1.524 meters), and most preferably within the range of 1 to 5 feet (0.3048 to 1.524 meters).

An alternative embodiment combines the telescoping subassembly with inflatable packers or pressure actuated, outwardly extending mechanical arms 24 (shown dotted for clarity in FIG. 3). A first arm (or inflatable packer) 24 is attached to one tubular element and extended (or inflated) prior to assembly actuation. This anchors one tubular element of the telescoping assembly and moves or actuates (e.g., opens) the other by increasing pressure. A further increase in fluid pressure (or a fluid restriction delaying arm actuation or inflation) later actuates/inflates a second arm or inflatable packer attached to the other (previously actuated) tubular element of the subassembly. By delaying or controlling the second arm or packer pressure release, a pressure decrease first deactivates or deflates the first arm or packer (releasing the first anchor) and draws the first tubular element to the moved side, thus positively snaking the assembly into or out of the borehole solely by changing pressure.

FIG. 4 shows a steerable drilling application in a deviated well. A telescoping subassembly 2 is attached upwell to drill pipe 3 and downwell to a non-magnetic drill collar 25. The non-magnetic drill collar 25 is typically composed of monel and is used in conjunction with a orienting subassembly 26 and a Measurement While Drilling (MWD) tool 27. The collar 25, orienting subassembly 26, and MWD 27 combine to allow remote well location/direction measurements during drilling. Based upon the location/direction measurements, the steerable mud motor 28 and drill bit 21 can be controlled to drill an extended reach well to a specific underground location.

The procedure for drilling with the steerable motor shown in FIG. 4 starts with assembling the subassemblies as shown and lowering the assembly into a (pre-drilled) hole. Mud (fluid) circulation is then established by supplying pressurized mud at the surface (not shown for clarity) and recovering mud from the annular space outside the assembly but within the pre-drilled hole. Using a wireline or other tools lowered from the surface, underground orientation and location of the assembly are determined. The mud motor is re-oriented if the determined orientation is not acceptable.

The drill bit is actuated and lowered until the bit is forced against the well bottom and the telescoping subassembly is moved to a neutral position (between an open and closed position) from the open position. This well bottom force and movement is indicated by a decline or slack off in hook load (force supporting the drill pipe), typically a reduction of approximately 2,000 pounds (8896 newtons). As drilling extends the hole depth, the drill pipe is lowered (and sections added), i.e., the drill pipe "chases" the drill bit. Drilling loads (and drilling) speed can be controlled by mud pressure and maintaining "chasing" hook load (to continue a neutral position of the assembly). Control of mud motor (or rotary table) rpm can also be used to control penetration rate and other drilling parameters, along with other normal drilling practices.

Still other alternative embodiments include: a telescoping subassembly without an orifice 10 (by the selection of fluid contacting areas, sliding or other seals, external fluid pressure and other fluid restrictions can generate pressure actuating forces), combining the telescoping assembly with other tools and devices, such as a depth transmitter and step out deviators (allowing deviated portion to begin at a known depth), having the sliding subassembly elements composed of (or coated by) a plastic or other slippery material (to minimize sliding friction losses), and placing the telescoping elements within a protective tubular member or enclosure (to prevent scraping damage during rotation or running to sliding surfaces).

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. An apparatus useful in moving a portion of elements in a duct string relative to the remaining portion of the duct string, the duct string forming a passageway capable of transmitting a fluid from near one end to near the other when located in a borehole, said apparatus comprising:
 a first duct portion for transmitting a fluid at a first pressure along a major axis;
 means for supporting said duct portion when a first end of said duct portion is located within said borehole;
 a telescoping subassembly attached to said first end and also attached to a second duct portion in a first axial position, said subassembly capable of overcoming a resistance to axial motion to actuate said second duct portion to a second axial position in the absence of motion of said first duct portion when said first pressure is changed to a second pressure, wherein said second duct portion in said second axial position is capable of contacting said borehole;
 means for rotary drilling attached to said second duct portion; and
 wherein at least a portion of said borehole is substantially deviated from a vertical direction.

2. The apparatus of claim 1 wherein said means for supporting is adjustable and said subassembly also comprises a first tubular element slidably attached to a second tubular element and a sliding seal for restricting the flow of said fluid at an interface between said elements.

3. The apparatus of claim 2 which also comprises an orifice for restricting the passage of said fluid to at least of portion of said assembly.

4. The apparatus of claim 3 wherein said orifice is attached to one of said elements.

5. The apparatus of claim 4 which also comprises an outwardly extendable device attached to one of said elements and capable of contacting said attached element to said borehole when said subassembly is actuated.

6. The apparatus of claim 5 wherein at least a portion of said borehole is deviated from a vertical direction and said subassembly also comprises a stop surface preventing axial motion beyond a fully open position and wherein said first position is less than a fully open position and said second position is a fully open position.

7. The apparatus of claim 6 wherein said second pressure is independent of said first position.

8. The apparatus of claim 6 wherein said second pressure is dependent upon said first position.

9. The apparatus of claim 8 wherein said change in said pressures results in an axial force on said second duct portion of at least 2,000 pounds which exceeds said resistance to motion.

10. The apparatus of claim 9 which also comprises a drilling subassembly.

11. The apparatus of claim 10 wherein said drilling subassembly comprises:
 a drill collar attached to said telescoping subassembly;
 an orienting subassembly attached to said drill collar;
 a measurement tool attached to said orienting subassembly;
 a steerable motor attached to said measurement tool; and
 a drill bit actuated by said motor.

12. An apparatus useful in moving a portion of a duct relative to the remaining portion of the duct in the absence of substantial rotation, the duct being capable of transmitting fluid from near one end to near another end in a borehole below a ground surface, said apparatus comprising:
 an upwell duct portion for transmitting a fluid at a first pressure along a major axis of said duct portion;
 a telescoping subassembly attached in a first position to said first end;
 a downwell duct portion attached in a first axial position to said subassembly, said subassembly and attached downwell duct portion capable of overcoming a resistance to axial motion to actuate said downwell duct portion to a second axial position when said first pressure is changed, wherein said downwell duct portion in said second axial position is capable of contacting said borehole;
 means for attaching said duct to said borehole; and
 wherein at least a portion of said borehole is substantially deviated from a vertical direction.

13. The apparatus of claim 12 wherein said duct is attachable to said borehole at a location spaced apart from said ground surface.

14. The apparatus of claim 13 wherein said duct is a liner.

15. The apparatus of claim 12 wherein said duct is a casing and said means for attaching is a cement.

16. An apparatus useful in inserting a portion of an inner duct into a outer duct attached to a ground surface, the inner duct being capable of transmitting fluid from near one end to near another end, said apparatus comprising:
 a first duct portion of said inner duct for transmitting a fluid at a first pressure along a major axis;
 a telescoping subassembly attached to said first duct portion;
 a second duct portion of said inner duct attached to said subassembly in a first axial position, said subassembly and attached second duct portion capable of overcoming a resistance to axial motion to move to a second axial position when said first pressure is changed, wherein said second duct portion is capable of contacting said outer duct when moving from said first axial position to said second axial position;
 means for attaching said inner duct to said outer duct string; and
 wherein at least a portion of said outer duct is substantially deviated from a vertical direction.

17. The apparatus of claim 16 wherein said inner duct is a liner.

18. The apparatus of claim 17 wherein said outer duct is a casing.

19. The apparatus of claim 18 which also comprises:
 a second telescoping subassembly attached to said second duct portion; and
 a third duct portion attached to said second telescoping subassembly in an initial axial position, said attached third duct portion capable of overcoming a resistance to axial motion to move to a final axial position when said first pressure is changed, wherein said third duct portion is capable of contacting said outer duct when moving from said initial axial position to said final axial position.

* * * * *